United States Patent Office 3,242,089
Patented Mar. 22, 1966

3,242,089
HEAT-TREATING METHOD FOR MODIFYING PERMEABILITY AND QUALITY FACTOR OF NICKEL-ZINC-COBALT FERRITE
Walter T. Bartow, Naperville, and Bert L. Head, Brookfield, Ill., assignors to Western Electric Company, Incorporated, New York, N.Y., a corporation of New York
No Drawing. Filed Aug. 20, 1962, Ser. No. 218,151
7 Claims. (Cl. 252—62.5)

The present invention relates generally to processes of modifying the electrical and magnetic properties of a fired nickel-zinc-cobalt ferrite core body, and to fired ferrite bodies having their electrical and magnetic properties modified by such processes. The general objects of the invention are to provide new and improved processes, and improved ferrite core bodies, of such character.

More specifically, the invention contemplates processes for increasing the quality factor Q and increasing or decreasing, as desired, the permeability of a fired nickel-zinc-cobalt ferrite core. The particular ferrites under consideration have the following composition on a percentage by weight basis: 50 to 89% of ferric oxide, 1 to 40% of nickel oxide and 1 to 40% of zinc oxide plus 0.1 to 3% of cobalt oxide.

As is well-known to those skilled in the art, various additive agents are employed to impart improved electrical and magnetic properties to a ferrite composition prior to the firing thereof, some increasing resistivity and some increasing the permeability of the ferrite. The particular additive employed, as well as the quantity thereof, are determined primarily by the intended use of the resulting magnetic core and the frequency of the exciting current. Modifications of the electrical and magnetic properties of ferrite cores containing additives are reflected by a change in the quality factor Q, which is defined as the ratio of the reactance to the resistance of the core.

Such additives, however, must be added prior to compaction and firing of the core and thus cannot be used to modify the magnetic properties of fired ferrite cores. Indeed, there are few known processes in the prior art which can modify the magnetic properties of ferrite cores which have previously been fired and ground. That such methods are desirable is inherently obvious, particularly if one considers how advantageous it would be if the quality factor Q and the permeability of a ferrite core could be modified so as to comply with the specifications of a particular application after it has been fired and ground to the prescribed tolerances.

Therefore, a more specific object of the invention is to provide new and improved methods of modifying the quality factor Q of a ferrite core which has previously been ground and fired.

Another objects of the invention is to provide new and improved methods of modifying the permeability of ferrite cores which have previously been ground and fired.

A further object of the invention is to provide new and improved nickel-zinc-cobalt ferrite cores having their electrical and magnetic properties modified in accordance with such methods.

A process by which these and other objects are accomplished in accordance with the invention includes the steps of heating a fired ferrite core (having a composition on a percentage by weight basis of 50 to 89% ferric oxide, 1 to 40% nickel oxide, and 1 to 40% of zinc oxide, plus 0.1 to 3% of cobalt oxide) to a temperature between 550° F. and 650° F. The core is then cooled to room temperature whereby the quality factor Q of the core is increased, and the permeability is either increased or decreased, as desired, depending upon the rate of cooling.

In accordance with a specific embodiment of the invention, such a fired ferrite core body is heated to a temperature between 550° F. and 650° F. and held at this temperature from 1 to 60 minutes. To increase both the quality factor Q and the permeability of the fired ferrite body, it is then cooled rapidly in still air at room temperature. Alternatively, to increase the Q factor and decrease the permeability, the core is instead cooled relatively slowly, preferably at a controlled rate of up to 60 degrees (F.) per hour to room temperature.

To facilitate a better understanding of the present invention, a general description of the forming of a ferrite core initiates the detailed description of the invention. Normally, the initial oxide mixture is composed of at least 50% by weight of ferric oxide, and electrical and magnetic modifying metal oxides (e.g., zinc oxide and nickel oxide respectfully). These elements are thoroughly mixed to produce a homogeneous dispersion of the metal oxides so that subsequent reactions take place uniformly throughout the entire mass of the mixture.

The mixture is then exposed to a first heat treating operation, carried out in any suitable type of kiln or furnace at a temperature of approximately 1700° F., to calcine the mixture, and to effect a significant removal of oxygen and a reduction of carbonaceous materials. The product of the calcining operation is then cooled and an additive agent combined therewith if it is desired to enhance the electrical an magnetic properties of the magnetic composition. The resulting product is then ground in a mill to a predetermined particle size in order to secure uniformity of treatment in the subsequent operation, as well as to provide such particle or crystal size as is best suited to the particular field of use of the magnetic composition.

Water and a binder are generally added to the product in the mill, and the resulting composition is subsequently spray-dried to form a powder. The fine ground mixture is then compacted and pressed by any suitable apparatus into articles of a shape and size determined by the desired configuration of the finished magnetic cores, due allowance being made for shrinkage during a second heat treatment.

The shaped core is then subjected to a second heat treatment, carried out in any suitable type of kiln or furnace at a temperature of approximately 2150° F., to fire the shaped articles and thereby harden them into magnetic cores. The cores are then ground to the prescribed tolerances and thereby completed as conventional finished ferrite cores.

According to the above general description, the ferrite cores undergo only two stages of heat treatment. It has been discovered, however, that by subjecting the finished ferrite core to a third heat treating operation the electrical and magnetic properties of the core, specifically the quality factor Q and the permeability, can be modified to comply with the specifications of the intended application. In accordance with a preferred embodiment of the invention the finished core (compacted and fired) is heated at a rate of 1000 degrees (F.) per hour to a temperature between 500° F. and 650° F. It should be noted that the rate at which the core is heated is not critical and may range anywhere up to and including 1000 degrees (F.) per hour.

The ferrite core is held at this temperature for approximately an hour and is then cooled to room temperature. The rate of cooling is very critical as it determines whether both the quality factor Q and the permeability of the core will be increased, or the quality factor Q increased and the permeability decreased.

As is well-known to those skilled in the art, the quality factor Q represents the ratio of the reactance to the resistance of a magnetic core. For purposes of completeness of the disclosure, however, the quality factor Q is more adequately defined by the equation:

$$Q = \frac{2\pi f L}{\Delta R}$$

where L is the self-inductance of the coil with its intended magnetic core, $f$ is the frequency of the exciting magnetic field, and $\Delta R$ is the effective resistance of the coil.

To increase both the permeability and the quality factor Q, the heated core is cooled rapidly in the ambient air of the room to room temperature. On the other hand, the permeability of the core is decreased and the quality factor Q increased when it is cooled at a slower, controlled rate such as 40 degrees (F.) per hour. It is to be understood that the rate of cooling is not intended to be limited to this figure, but may vary anywhere up to 60 degrees (F.) per hour.

The exact reasons for these unexpected modifications in the magnetic properties of the core are not understood, nor is it at all clear why the rate of cooling should be so critical in determining the resultant change in the permeability of the core. Such phenomena is believed to be connected in some way with the specific crystalline stucture of the ferrite as it is affected by such heat treatment.

It is believed that during the first heat treatment a certain amount of ferric oxide is converted to ferrous oxide, and during the cooling of the second heat treatment (or firing of the core) the ferrous oxide reverts to magnetite and minute particles of metallic iron. It is further theorized that these iron particles are relatively displaced from each other during the cooling stage of the third heat treatment and are effectively insulated from one another by the nickel, zinc, and cobalt oxides, the amount of spacing being dependent upon the rate of cooling.

While one specific embodiment is described hereinabove, various modifications may be made without departing from the spirit and the scope of the invention.

What is claimed is:

1. A method of modifying the electrical and magnetic properties of a fired nickel-zinc-cobalt ferrite core body containing 50 to 89% by weight of ferric oxide, 1 to 40% by weight of nickel oxide, and 1 to 40% by weight of zinc oxide plus 0.1 to 3% by weight of cobalt oxide, which consists of the steps of:
   heating the previously fired ferrite body to a temperature between 550° F. and 650° F., and
   cooling the ferrite body to room temperature, whereby the quality factor Q of the core is increased and the permeability is varied as a function of the rate of cooling.

2. The method as recited in claim 1, wherein the ferrite body is cooled at a controlled rate of up to 60 degrees (F.) per hour to room temperature, whereby the quality factor Q of the core is increased and the permeability is decreased.

3. The method as recited in claim 1, wherein the ferrite body is cooled rapidly by exposure to ambient air at room temperature, whereby both the quality factor Q and the permeability of the core are increased.

4. A method of modifying the electrical and magnetic properties of a fired nickel-zinc-cobalt ferrite core body containing 50 to 89% by weight of ferric oxide, 1 to 40% by weight of nickel oxide, and 1 to 40% by weight of zinc oxide plus 0.1 to 3% cobalt oxide, which consists of the steps of:
   heating the ferrite body to a temperature between 550° F. and 650° F.,
   maintaining the ferrite body at the temperature attained in the heating step for a period of from 1 to 60 minutes, and
   cooling the ferrite body to room temperature, whereby the quality factor Q of the core is increased and the permeability is varied as a function of the rate of cooling.

5. The method as recited in claim 4, wherein the ferrite body is cooled at a controlled rate of up to 60 degrees (F.) per hour to room temperature, whereby the quality factor Q of the core is increased and the permeability is decreased.

6. The method as recited in claim 4, wherein the ferrite body is cooled at a controlled rate of 40 degrees (F.) per hour to room temperature, whereby the quality factor Q of the core is increased and the permeability is decreased.

7. The method as recited in claim 4, wherein the ferrite body is cooled rapidly in still air at room temperature, whereby both the quality factor and the permeability of the core are increased.

References Cited by the Examiner

UNITED STATES PATENTS

| | | | |
|---|---|---|---|
| 2,452,529 | 10/1948 | Snoek | 252—62.5 |
| 2,452,530 | 10/1948 | Snoek | 252—62.5 |
| 2,452,531 | 10/1948 | Snoek | 252—62.5 |
| 2,989,475 | 6/1961 | Eckert et al. | 252—62.5 |
| 3,055,832 | 9/1962 | Weisz | 262—62.5 |

OTHER REFERENCES

Harvey et al.: Ferromagnetic Spinels, etc., RCA Review, September 1950, vol. XI, No. 3, pp. 344–349.

TOBIAS E. LEVOW, *Primary Examiner.*

MAURICE A. BRINDISI, *Examiner.*